(No Model.)
J. T. JONES.
CAR WHEEL BEARING.
No. 585,523. Patented June 29, 1897.
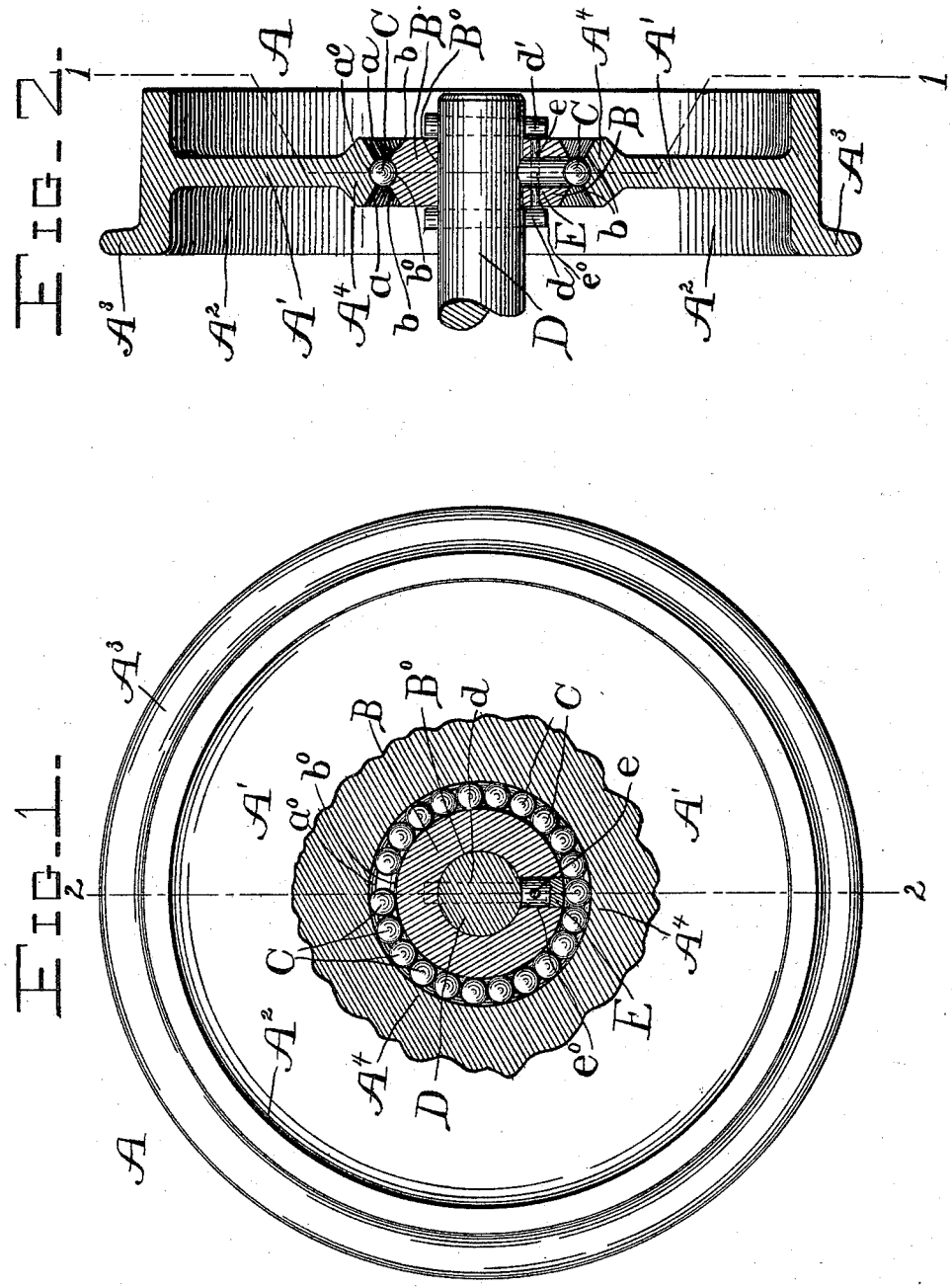
WITNESSES
D. H. Blakelock
J. Stephen Giusta
INVENTOR
J. T. Jones,
by Whitman & Wilkinson
ATTORNEYS.

UNITED STATES PATENT OFFICE.

JOHN T. JONES, OF IRON MOUNTAIN, MICHIGAN.

CAR-WHEEL BEARING.

SPECIFICATION forming part of Letters Patent No. 585,523, dated June 29, 1897.

Application filed November 9, 1896. Serial No. 611,517. (No model.)

*To all whom it may concern:*

Be it known that I, JOHN T. JONES, a citizen of the United States, residing at Iron Mountain, in the county of Dickinson and State of Michigan, have invented certain new and useful Improvements in Car-Wheel Bearings; and I do hereby declare the following to be a full, clear, and exact description of the invention, such as will enable others skilled in the art to which it appertains to make and use the same.

My invention relates to improvements in car-wheels; and it consists of certain novel features hereinafter described and claimed.

Reference is had to the accompanying drawings, wherein the same parts are indicated by the same letters throughout both views.

Figure 1 represents a side elevation of a car-wheel constructed according to my invention, partly in section, on the line 1 1 of Fig. 2; and Fig. 2 is a section through the same, taken on the line 2 2 of Fig. 1.

The wheel is composed of two separate portions—viz., the outer portion or wheel proper, A, which is composed of the web A' and the tread-ring A², having the usual flange A³, and the hub B, having the central opening B⁰ for the axle D, as shown.

The web A' has a circular central opening and around this opening a thickened portion A⁴. A groove $a^0$ is formed centrally around the interior of this opening in the web, and the beveled sides *a a* of this opening diverge outward from the said groove, as seen in Fig. 2. The smallest diameter of this central opening in the web is slightly greater than the largest diameter of the hub B, as also seen in Fig. 2 of the drawings.

The hub B has a groove $b^0$, formed centrally around its periphery, and has beveled surfaces *b b*, diverging outward from said grooves.

The antifriction-balls C run in the grooves $a^0$ and $b^0$ in the central opening of the web A' and in the periphery of the hub B, respectively. These balls are put into position through a radial opening $e^0$ in the hub B, and into this radial opening is afterward fitted a plug E, which is held in position by means of a pin or key *e*, driven through an opening in the hub and an opening through the said plug, as seen most clearly in Fig. 2. The ends of this plug E are hollowed out to correspond with the inner and outer surfaces of the hub.

The hub B is rotatably mounted upon the axle D and is held in place thereon by means of cotter-pins *d* and *d'*, as seen in Fig. 2, or a shoulder may be formed on the axle to take the place of the inner cotter-pin *d*, if preferred.

The outer portion or wheel proper, A, may rotate upon the balls C around the hub B, and the latter, as above described, may also rotate upon the axle D. The outer portion A will be held upon the hub B by means of the balls C, which together act as a continuous key to hold the parts together, but at the same time permit of a slight play or swaying motion of the outer portion A of the wheel. One of the advantages of my construction is that this lateral play will allow the outer portion of the wheel to overcome any unevenness in the track laterally without binding at the hubs, as in going around curves. It will also be seen that the balls may be readily cleaned by means of a brush or other suitable implement, when necessary, without removing them from the wheel. These and many other advantages of my herein-described wheel will be apparent to any one skilled in the art.

Having thus described my invention, what I claim, and desire to secure by Letters Patent of the United States, is—

1. In a car-wheel, the combination with the circular hub B having central opening B⁰ for the axle, and having a shallow groove $b^0$ around its periphery, and the radial opening $e^0$ leading from said central opening to said peripheral groove; a removable plug provided with concaved ends adapted to close said radial opening, and means for holding said plug in position; of the wheel proper A composed of a tread-ring A², and a web having a central circular opening therein of a slightly greater diameter than the periphery of said hub, with a central groove $a^0$ around the circumference of said opening; and balls working between said hub and web in said grooves $a^0$ and $b^0$, and serving both as a bearing between the wheel and its hub and to hold the said parts together, substantially as described.

2. In a car-wheel, the combination with the circular hub B having central opening $B^0$ for the axle, and having a shallow groove $b^0$ around its periphery, and the radial opening $e^0$ leading from said central opening to said peripheral groove; a removable plug provided with concaved ends adapted to close said radial opening, and means for holding said plug in position; of the wheel proper A composed of a widened tread-wing $A^2$, and a thin web A' having a circular central opening therein of a slightly greater diameter than the periphery of said hub, with a thickened annular portion around said opening, and a central groove $a^0$ around the circumference of said opening; and balls working between said hub and web in said grooves $a^0$ and $b^0$, and serving both as a bearing between the wheel and its hub and to hold the said parts together, substantially as described.

In testimony whereof I affix my signature in presence of two witnesses.

JOHN T. JONES.

Witnesses:
F. E. CROCKER,
H. M. PELHAM.